Figure 1:
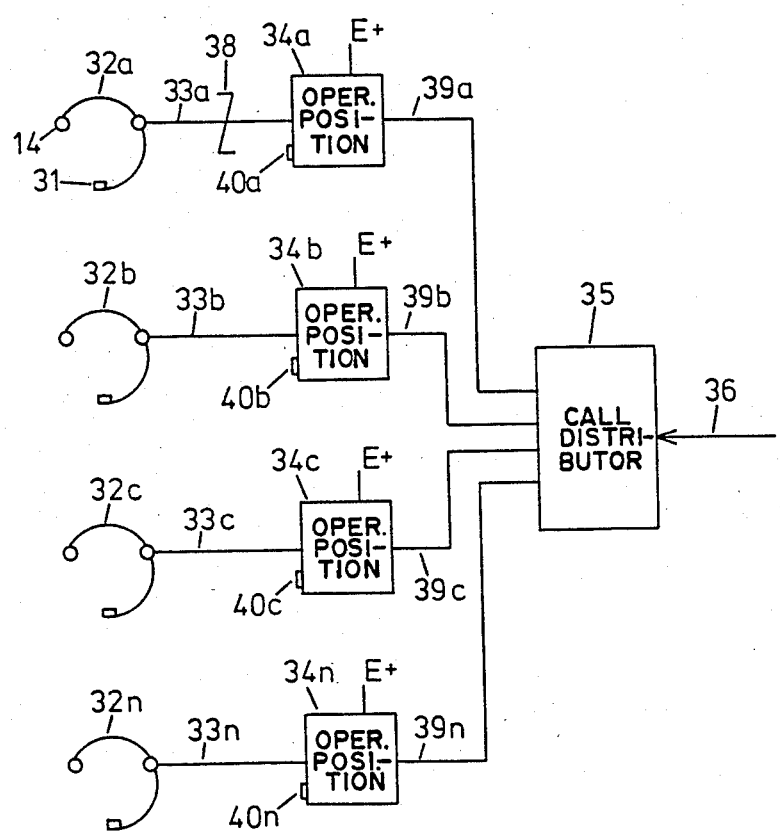

United States Patent [19]

Elbaek

[11] Patent Number: 4,499,337
[45] Date of Patent: Feb. 12, 1985

[54] COUPLER FOR MICROTELEPHONE SET

[75] Inventor: Jørgen F. Elbaek, Copenhagen, Denmark

[73] Assignee: Danavox A/S, Copenhagen, Denmark

[21] Appl. No.: 404,699

[22] Filed: Aug. 3, 1982

[30] Foreign Application Priority Data

Aug. 11, 1981 [DK] Denmark .............................. 3554/81

[51] Int. Cl.³ ...................... H04M 1/00; H04M 19/04
[52] U.S. Cl. ................................. 179/27 D; 179/84 T
[58] Field of Search ................. 179/84 T, 81 B, 27 D, 179/27 FB

[56] References Cited

U.S. PATENT DOCUMENTS 3,991,282 11/1976 Feil .................................... 179/99 A
4,063,047 12/1977 Huryn ............................... 179/99 P
4,367,376 1/1983 Proctor et al. .................... 179/84 T

FOREIGN PATENT DOCUMENTS 1195360 6/1965 Fed. Rep. of Germany .... 179/84 T
2,903,886 1/1980 Fed. Rep. of Germany .
2391609 8/1981 France .

Primary Examiner—Thomas W. Brown
Attorney, Agent, or Firm—Merchant, Gould, Smith, Edell, Welter & Schmidt

[57] ABSTRACT

An electronic coupler for a microtelephone set (14, 31) for the coupling of an amplifier (2) in a telephone line (33a) to an operating position in a telephonist-operated switchboard with automatic call distributor comprises a coupling circuit (1) with a field-effect transistor which is coupled in parallel across the amplifier (2) in such a manner that, when the supply current (E+) is coupled to the amplifier (2), it has great impedance against incoming A.C. signals in the audio frequency range, for example a ringing signal, whereby the line (29a, 29b) is connected to the telephone cartridge (14) via the amplifier (2), and also that the coupler (1) has low impedance against incoming A.C. signals when the supply current (E+) is not coupled to the amplifier (2), so that the line (29a, 29b) is coupled (37) around the amplifier (2) and connected directly to the telephone cartridge (14). What is thus achieved is that the telephonist merely has to await an acoustic signal via the telephone cartridge (14), which indicates that there is an incoming call to be answered or put through to an extension, after which the telephonist applies voltage to the operating position by activating a switch and answers the incoming call. The construction and the dimensions of the coupler are such that there is substantially achieved impedance matching between the telephone cartridge (14) and the line (29a, 29b) in both coupling situations.

2 Claims, 3 Drawing Figures

COUPLER FOR MICROTELEPHONE SET

This invention relates to a coupler for a microtelephone set for the coupling of an amplifier in a telephone line to an operator's position, particularly in a telephonist-operated switchboard with automatic call distributor.

Known PBX (private automatic branch exchange) systems with electronic coupling of an engaged telephone line to an operator's position are arranged in such a way that a call cannot be coupled through to the individual telephonist until the telephonist has activated a switch, usually a switch which connects the supply voltage to the circuit at the operating position, said circuit including, among other things, amplifiers for the microphone and telephone circuits. Such a PBX system is known, for example, from U.S. Pat. No. 3,999,019.

In PBX systems with automatic call distributors, where an electronic circuit constantly scans the operating positions to determine whether they are engaged or disengaged, and distributes the incoming calls to the disengaged positions, it is inexpedient that the telephonist, as soon as not engaged, must activate a switch to receive possible incoming calls.

The object of the present invention is thus to provide a coupler for a microtelephone set which is arranged in such a manner that the ringing signal, or any other electric signal in the normal frequency range for telephony, is coupled directly to the disengaged telephonist, who can then wait with the activation of the switch until there is a call that the telephonist concerned shall answer. A further object of the invention is to provide a simple, reliable and space-saving solution to the coupler problem, and at the same time herewith an inexpensive coupler.

This is achieved in that the coupler according to the invention is an electronic coupler with a field-effect transistor, coupled in parallel across the amplifier and thus connected to this in such a manner that when the amplifier's supply current is connected, said coupler offers high impedance against incoming A.C. signals in the audio frequency range, whereby the line is connected to the microtelephone set via the amplifier, and that the coupler offers low impedance against incoming A.C. signals when the amplifier's supply current is not connected, whereby the line by-passes the amplifier and is connected directly to the microtelephone set.

What is thus achieved is that the telephonist must merely await an acoustic signal via the microtelephone set, said signal indicating that there is an incoming call that the telephonist must answer or put through to an extension telephone. Hereafter, that is not until the incoming call has been observed, the switch can be activated by the telephonist, thus connecting the supply current to the operating position in the normal way, and the telephonist can answer the incoming call.

The appended claims define advantageous embodiments of the invention, whereby a simple construction of practical applicability is achieved.

As defined in the claims, when a field-effect transistor of the drain type is used, a coupling circuit is provided which functions at zero potential, in that a transistor of this type in zero potential condition is a reasonably good electrical conductor. One hereby avoids the use of electronic circuits which require an operating voltage or a mechanical switch, either of the relay type or one requiring operational effort, to effect the necessary coupling of a signal path between the line selected by the automatic call distributor and the telephonist's telephone cartridge.

With the embodiment of the coupler as further defined in the claims, the coupling circuit can be decoupled from the amplifier in such a manner that there is impedance matching between the telephone line with the incoming call and the amplifier, which must amplify the incoming call and lead it further to the telephone cartridge of the microtelephone.

With the embodiment of the coupler as defined in the claims, a definite and controlled signal path by-passing the amplifier is established, so that an incoming call at an operating position without current is still led directly to the telephone cartridge of the microtelephone.

Finally, with the embodiment of the coupler as defined in the claims, impedance matching within the generally determined tolerances is achieved between the line with the incoming call and the telephone cartridge, so that the telephonist can perceive and understand an incoming signal which, for example, can be a ringing signal, and thereafter activate a switch to couple the operating position and then answer the incoming call.

Figure 2:
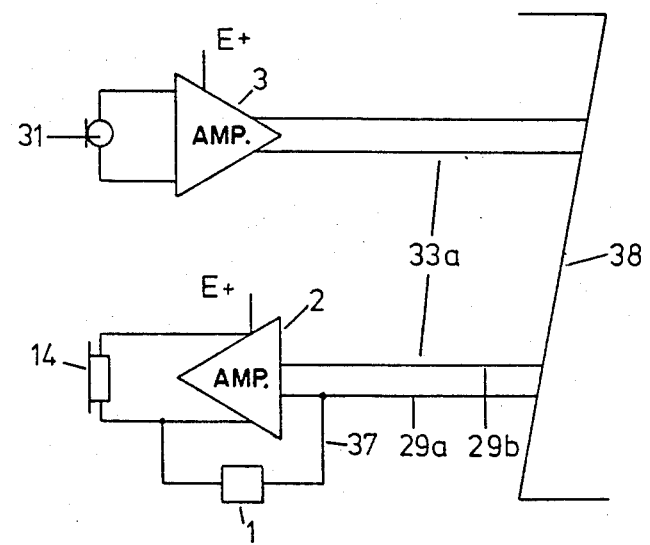
Figure 3:
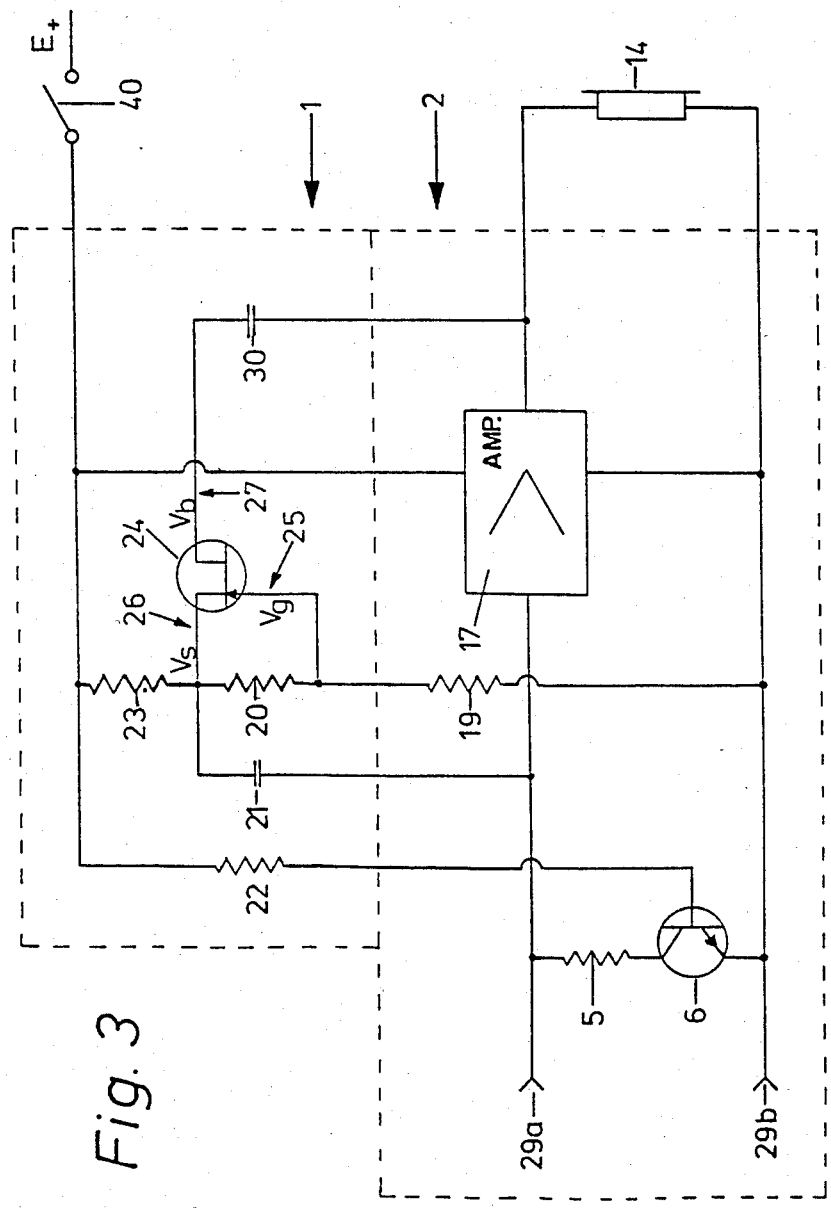

A preferred embodiment of the invention will now be described in closer detail and with reference to the accompanying drawings, where FIG. 1 is a schematic drawing showing a number of operating positions at a private automatic branch exchange with automatic call distributors, FIG. 2 is a section of FIG. 1 showing part of the circuit and the microtelephone set for an operating position, and FIG. 3 is a detail drawing of the coupler.

With reference to FIG. 1, the arrow 36 indicates the incoming telephone lines which, via an automatic call distributor 35, can be coupled to one of a number of operating positions which are each manned by a telephonist. The four operating positions shown in FIG. 1 have all been given the same reference numbers, but with the appendix of the letters a, b, c and n from the top position to the bottom position respectively. It is only by way of example that there are shown four operating positions 34a, 34b, 34c, 34n, in that the number depends on the relevant PBX's number of extensions, the number of incoming lines, the number of incoming calls etc., in brief the number depends on the size of the relevant company and the level of service desired to be attained in the speed at which incoming calls can be coupled through to a telephonist. An automatic call distributor 35 sends the incoming calls to a disengaged telephonist, in that the call distributor constantly scans the operating positions, for example by measurements on the lines, and thus ascertains and registers as soon as a telephonist is disengaged.

The lines 39a, 39b, 39c and 39n from said call distributor 35 are connected to the operating positions 34a, 34b, 34c and 34n. Each operating position has a line E+ from the system's common current supply, which with a switch 40a, 40b, 40c, 40n can and must be coupled when a telephonist, via the microtelephones 32a, 32b, 32c, 32n through the lines 33a, 33b, 33c, 33n, wishes to answer an incoming call. The microtelephone can comprise, for example, a headset with microphone 31 and telephone cartridge 14.

In the line 33a in FIG. 1 is shown a section 38, and the leads and components from section 38 to and including the microtelephone set are shown in detail in FIG. 2.

From FIG. 2 it can be seen that the line 33a consists of a two-wire set, namely one set in connection with the microphone 31 via microphone amplifier 3 and another set in connection with the telephone cartridge 14 via the amplifier 2. The microphone circuit is not active until the telephonist has connected the supply lead E+ to the amplifier 3 by means of the switch 40a, see FIG. 1. The amplifier 3 can be located in the microtelephone or in the operating position 34a, see FIG. 1, or in another place. Since the microphone circuit does not form part of the present invention, it will not be described in further detail in the following.

Under the microphone circuit in FIG. 2 is shown a two-wire connection which leads to the telephone cartridge circuit, this circuit comprising an amplifier 2 coupled with a telephone cartridge 14 and an electronic coupler 1 in accordance with the invention. The effect of the coupler 1 will now be described in closer detail.

The telephonist at operating position a, to which the supply voltage E+ is cut off, is disengaged, which the automatic call distributor has ascertained, for example by measuring the impedance of the line. Thus the automatic call distributor couples the next incoming call to the telephonist at position a, in that a ringing signal, for example an A.C. signal of 800 Hz, is sent via the lead 39a to operating position 34a, see FIG. 1, and further through the two-wire telephone line, that is the lower pair of leads 29a, 29b, to the coupling amplifier 2. However, the signal cannot pass the coupling amplifier because E+ is cut off, but a lead 37 and an electronic coupler 1 form a bypass circuit which conducts the signal directly to the telephone cartridge 14, so that the telephonist can hear the signal and activate the switch 40a, see FIG. 1, and answer the call. When the switch 40a is activated, the supply voltage E+ is connected to both the microphone amplifier 3 and the telephone coupling amplifier 2, while at the same time there occurs a blocking of the bypass coupling, the reason being that the electronic coupler 1 is brought into a condition of high impedance.

The electronic coupler 1 and its joint action with the coupling amplifier 2 will now be described in closer detail with reference to FIG. 3.

The stippled frame 1 in FIG. 3 indicates the electronic coupler, and the stippled frame 2 indicates the amplifier coupling to the telephone cartridge 14. The incoming A.C. signal, for example a 800 Hz ringing signal, is received on the input terminals 29a and 29b, from which it is fed directly to an amplifier 17 which has the telephone cartridge coupled across its output. Across the input of the amplifier 17 is placed a transistor 6 in series with a resistor 5, these components forming an electronic switch. From voltage supply E+, supply current is fed through a switch 40, partly to the amplifier 17, to the electronic switch 6 through a resistor 22 and to a voltage divider consisting of the resistors 19, 20 and 23. This voltage divider supplies current to a field-effect transistor 24, preferably of the depletion mode type. The field-effect transistor comprises a conductor junction between the electrodes 26 and 27, so-called source and drain electrodes, said conductor junction being controlled by an electrode 25, the so-called gate electrode.

Also comprised are two condensers 21 and 30, whose function, together with the conductor junction of transistor 24, is to form a signal path around the amplifier 17 when the supply current from E+ is cut off by the switch 40. When the switch 40 is in the open position, as shown in FIG. 3, neither the amplifier 17, the electronic switch 5, 6 nor the transistor 24 is supplied with operating voltage. The voltage drop across the resistor 20 is thus 0 volts, and this is also the case with the electrodes 25 and 26 of transistor 24. In this zero potential condition, transistors of the field-effect transistor depletion mode type have low resistance in the conductor junction between the electrodes 26 and 27. Since it is not supplied with current, the amplifier 17 is closed/blocked and has thus almost infinitely high impedance against an incoming A.C. signal on the leads 29a and 29b. The transistor 6, which is a normal transistor, has high impedance in its emitter-base section when in the zero potential condition. An incoming A.C. signal on the input 29a, 29b can thus be conducted via condenser 21, transistor 24 and condenser 30 directly and unamplified to the telephone cartridge 14. The normal line impedance at the receiver line 29a, 29b, is 300 ohms at 1000 Hz, and if a telephone cartridge 14 with an impedance of, for example, 200 ohms at 1000 Hz is used, for example a telephone cartridge of the Danavox SM-N type of 220 ohms, substantially total impedance matching to the line is achieved, in that the impedance of the conductor section 26-27 in transistor 24 is typically in the order of 100 ohms or less at 1000 Hz. The function of the condensers 21 and 30 is to form a signal path for the A.C. signal, but to block direct current, which means that their values merely need to be chosen in accordance with the frequency range in which the circuit is to operate, typically 1000 Hz to 4000 Hz. Impedance matching between the line 29a, 29b and the amplifier coupling 2 is thus achieved, even though the switch 40 is open, and an incoming signal will still be reproduced substantially without distortion and at a reasonable level by the telephone cartridge 14.

When the telephonist hereafter activates switch 40, the supply voltage E+ is applied to all circuits, i.e., to the amplifier 17, to the electronic switch 5 - 6 and to the voltage divider consisting of resistors 19, 20, 23. If the voltage E+ and the voltage divider are merely greater than approx. 1.1 volts DC, there is such a high voltage drop across the resistor 20 and therewith potential difference between the electrode 25 and 26 that $V_G - V_S$ is sufficiently great to block the conductor junction in transistor 24, whereby the signal path around the amplifier 17 is completely cut off. At the same time herewith, the electronic switch 5-6 is provided with voltage on its control electrode, so that transistor 6 closes and, together with resistor 5, provides impedance matching between the line 29a and 29b and the input of amplifier 17, the result being that the incoming A.C. signal is fed correctly to the amplifier 17, where it is amplified and sent to the telephone cartridge 14. Impedance matching is thus achieved between the telephone cartridge 14 and the telephone line in both coupling situations, and in both cases the impedance matching is within the normal tolerances.

FIG. 3 is to be considered only as a detailed function diagram for the electronic coupler 1 and the amplifier 2, in that it will be obvious to an expert within the field that additional components must be used for the detailed active components to be supplied with the correct voltage, and all those familiar with the art will know how these components are calculated and dimensioned. Therefore, for the sake of clarity, these components have not been included in the diagram.

The microtelephone sets 32a, 32b, 32c and 32n each comprise a microphone 31 and a telephone cartridge 14 and, for example, can be of the Danavox Stetomike HMY 808 type with a microphone impedance towards the switchboard of 50 ohms, and with an earphone of magnetic type with an impedance of 300 ohms towards the switchboard, but in principle any type of headset or microtelephone set can be used.

I claim:

1. An electronic coupler for microtelephone sets (32a, 32b, ... 32n) for coupling an operator's telephone cartridge (14) to a telephone connection (36) through an operating position (34a, 34b, ... 34n) in a telephone operator's switchboard with an automatic call distributor (35), wherein an incoming call is signalled by coupling through an electric signal to an operator's telephone cartridge (14) where the signal is converted to an acoustic signal, said electronic coupler (1) including a field-effect transistor of the depletion mode type (24) having its conductor section coupled in parallel across an amplifier (17) and its gate (25) operatively coupled to a power supply terminal of the amplifier so that when power is applied to the power supply terminal of the amplifier, said transistor presents a high impedance against incoming A.C. signals in the audio frequency range presented to said amplifier and said transistor so that said signals are connected to a microtelephone set (32a, 32b, ... 32n) via the amplifier (17), and so that the conductor section of the transistor has low impedance against incoming A.C. signals when no power is being applied to the amplifier so that said signals by-pass the amplifier and pass through the conductor section of the transistor and are connected directly to the telephone cartridge (14) of the microtelephone set (32a, 32b, ... 32n).

2. An electronic coupler according to claim 1, wherein in front of and parallel with the input to the amplifier (17) there is a further transistor (6) which is coupled as an electronic switch, the base electrode of the further transistor (6) being operatively coupled to the power supply terminal of the amplifier so that power is applied to said base electrode at the same time as to the gate of the field-effect transistor, and wherein a voltage divider (19, 20, 23) is operatively connected to said power supply terminal and said gate so that only part of the power applied to the amplifier is applied to the gate of the field-effect transistor.

* * * * *